United States Patent
Shibayama et al.

(10) Patent No.: US 8,016,294 B2
(45) Date of Patent: Sep. 13, 2011

(54) SEALING DEVICE

(75) Inventors: Masanori Shibayama, Okayama (JP);
Hiroshi Seno, Okayama (JP)

(73) Assignee: Uchiyama Manufacturing Corp.,
Okayama-shi, Okayama (JP)

( * ) Notice: Subject to any disclaimer, the term of this patent is extended or adjusted under 35 U.S.C. 154(b) by 350 days.

(21) Appl. No.: 11/920,511

(22) PCT Filed: May 19, 2006

(86) PCT No.: PCT/JP2006/310070
§ 371 (c)(1),
(2), (4) Date: Aug. 5, 2008

(87) PCT Pub. No.: WO2006/123793
PCT Pub. Date: Nov. 23, 2006

(65) Prior Publication Data
US 2009/0058011 A1   Mar. 5, 2009

(30) Foreign Application Priority Data

May 19, 2005  (JP) .............................. P2005-146219

(51) Int. Cl.
*F16J 15/32* (2006.01)
(52) U.S. Cl. .................. 277/551; 277/572; 277/574
(58) Field of Classification Search .......... 277/353, 277/562, 551, 572, 573, 574
See application file for complete search history.

(56) References Cited

U.S. PATENT DOCUMENTS

| 4,434,985 | A  | * | 3/1984  | Sonnerat ....................... 277/353 |
| 5,201,528 | A  | * | 4/1993  | Upper ............................ 277/394 |
| 6,170,992 | B1 | * | 1/2001  | Angelo et al. ................. 384/477 |
| 6,550,973 | B2 | * | 4/2003  | Yeo ................................. 384/484 |
| 6,637,754 | B1 | * | 10/2003 | Ohtsuki et al. ................. 277/549 |

FOREIGN PATENT DOCUMENTS

| JP | 55-20984    | A1 | 2/1980  |
| JP | 62-501161   | A  | 6/1986  |
| JP | 6-281018    | A  | 10/1994 |
| JP | 2001-065704 |    | 3/2001  |
| JP | 2001-193748 | A  | 7/2001  |
| JP | 2003 106464 | A  | 4/2003  |

* cited by examiner

*Primary Examiner* — Shane Bomar
*Assistant Examiner* — Robert E Fuller
(74) *Attorney, Agent, or Firm* — Bacon & Thomas, PLLC

(57) ABSTRACT

A sealing device formed to seal between a fixed side member and a rotating side member, comprising a slinger having a fitting cylindrical part fitted to the rotating side member and a flange part formed at one end part of the fitting cylindrical part positioned on the outer side of a sealed portion so as to be extended in the radial direction. A core comprises at least a fitting cylindrical part fitted to the fixed side member. The sealing device is characterized in that one end part of the fitting cylindrical part positioned on the outer side of the sealed portion is projected outward more than the sealed portion side inner surface position of the flange part of the slinger and a part of a seal lip part is formed to be brought into elastically slidable contact with the extended end face of the slinger.

8 Claims, 4 Drawing Sheets

SEALING DEVICE

TECHNICAL FIELD

The present invention relates to a sealing device interposed into a necessary portion to be sealed between a stationary member and a rotary member which requires to be sealed like a bearing unit of a wheel suspension of vehicles, more particularly relates to a sealing device constructed such that a slinger is assembled with a core member for fixedly holding an elastic seal member which elastically and slidably contacts with the slinger.

BACKGROUND OF THE INVENTION

Such a sealing device has been disclosed in the following Patent Document 1 (JP-A-2001-65704) and Patent Document 2 (JP-A-2003-106464). The Patent Document 1 discloses a sealing device comprising a first sealing plate and a second sealing plate, one of them being a slinger, which have an L-shaped section and include a cylindrical wall and an upright wall (flange like portion) and a seal lip. The first and second sealing plates face each other, the tip end of the upright wall of the first sealing plate and the cylindrical wall of the second sealing plate stand face to face with a small radial gap (labyrinth), and the outer side face of the upright wall is set back inwardly from the end face of the cylindrical wall of the second sealing plate.

The Patent Document 2 discloses a sealing device in which the tip ends of the second dust lips (seal lip) elastically and slidably contacting with the inside of a metal ring (slinger) are disposed close so as to face each other, so that the deterioration of shrink range caused by abrasion and settling can be compensated, thereby preventing the ingress of dust into a closed space formed with two dust lips. Further, FIG. 1 of the Patent Document 2 shows an example wherein a part of the second seal portion contacts with the inside of the tip end portion of the outward flange (flange like portion) of the slinger.

SUMMARY OF THE INVENTION

The sealing device of the Patent Document 1 teaches that the sealing performance can be improved by the above constitution without complicating the structure. However, because the above-mentioned labyrinth is provided, dust and water easily enter the space surrounded with the first seal plate and the second seal plate from the labyrinth to be accumulated therein. If such condition is kept for a long time that dust and water are accumulated in the space, the dust and so on move in a slidably contacting portion of the seal lip and the slinger, thereby accelerating wear of the seal lip and deteriorating the durability.

The sealing device of the Patent Document 2 discloses that dust and so on are prevented from entering the closed space between the second dust lips and the function of preventing the ingress of dust can be kept for a long time. However, assuming that the outer annular body of metal to be provided outside of the sealing device does not exist, the function of preventing the ingress of dust (grist and so on) is not achieved at the entrance of the space surrounded with the first sealing portion and the second sealing portion. As the result, when the dust once enters the space, it moves to the portion where the dust lip and the outward flange of the slinger elastically and slidably contact, thereby arising abrasion of the dust lip. FIG. 1 of the Patent Document 2 shows an example wherein a part of the second seal portion contacts with the inside of the tip end portion of the outward flange (flange like portion) of the slinger, as mentioned above. However, it does not describe its function nor suggest it elastically and slidably contacts. Therefore, if such prior art is applied to the sealing device of the present invention which is assembled with the slinger and the core member which fixedly holds the seal member elastically and slidably contacting with the slinger, there is still a problem of the above-mentioned durability and the improvement is highly requested.

The present invention is proposed in view of the above-mentioned problems and the object of the present invention is to provide a newly developed sealing device which keeps superior sealing performance and durability with a simple structure.

A sealing device of the present invention comprises a slinger fixedly fitted into a rotary member, a core member fixedly fitted into a stationary member, and an elastic seal member attached to the core member, the elastic seal member having a plurality of seal lip portions elastically and slidably contacting with the slinger, thereby sealing a space between the stationary member and the rotary member. It is characterized in that the slinger has a fitting cylindrical portion to be fitted into the rotary member and a flange like portion extending in its radial direction from an outer edge of the fitting cylindrical portion than a sealed portion, the core member has at least a fitting cylindrical portion to be fitted into the stationary member, an outer end of the fitting cylindrical portion than said sealed portion of the cylindrical fitting portion projects out of the inside line of the sealed portion side of the flange like portion of the slinger, and a part of the seal lip portion is formed so as to elastically and slidably contact with an extended end face of the slinger.

According to the sealing device of the present invention, the extended end face of the flange like portion may be tapered. Further, according to the sealing device of the present invention, a tip end portion of an extended flange like portion may be further bent into the sealed portion side so as to form a second cylindrical portion in concentric with the fitting cylindrical portion of the slinger. Still further according to the sealing device of the present invention, a tone wheel may be integrally attached on the outer surface of the flange like portion of the slinger, and the tone wheel is magnetized in such a manner that a plurality of N poles and S poles are formed alternately in a circumferential direction, thereby constituting a magnetic encoder with a magnetic sensor fixed to the stationary member.

Effect of the Invention

According to the objective apparatus to which the sealing device of the present invention is applied, the portions of the slinger and the core member which are positioned outside relative to the sealed portion are generally exposed to the exterior environment depending on the applied place. According to the present invention, the outer end of the fitting cylindrical portion of the core member which is positioned outside relative to the sealed portion thrusts out of the inside portion of the sealed portion side of the flange like portion of the slinger and a part of the lip portion is formed so as to elastically and slidably contact with the extended end face of the slinger. Therefore, there is no gap to allow earth and sand, water, dust and so on to be entered in the space surrounded with the slinger and the core member having the seal member when the members may be exposed to the exterior environment, thereby preventing acceleration of abrasion of the seal member located in the space because of the ingress of dust and so on to a slidably contacting portion. Further, a part of the lip portion slidably contact in an elastic condition with the extended end face of the slinger, so that the contacting force becomes strong and the ingress of dust can be effectively prevented.

When the extended end face of the slinger is tapered as mentioned in the present invention, the contacting area of the lip portion becomes large, thereby more effectively preventing the ingress of dust and being advantageous in its dimensional design. Further according to the present invention, when a tip end portion of an extended flange like portion is further bent into the sealed portion side so as to form a second cylindrical portion in concentric with the fitting cylindrical portion of the slinger, the space is formed by double cylindrical portions of the fitting cylindrical portion and the second cylindrical portion of the slinger, by the core member having the seal member and by the flange like portion. In cooperating with such function and the function of elastic sliding contact of the lip portion with the extended end face of the slinger, the dust prevention function into the space can be more improved.

Still further according to the sealing device of the present invention, when a tone wheel which constitutes a magnetic encoder with a magnetic sensor fixed at the stationary side is integrally attached on the outer face of the flange like portion of the slinger, the tone wheel and the magnetic sensor simply constitute a magnetic encoder so that the rotation of the rotary member can be detected, thereby achieving a practically high value sealing device while combining this function with the above-mentioned durability.

DETAILED DESCRIPTION OF THE INVENTION

Figure 1:
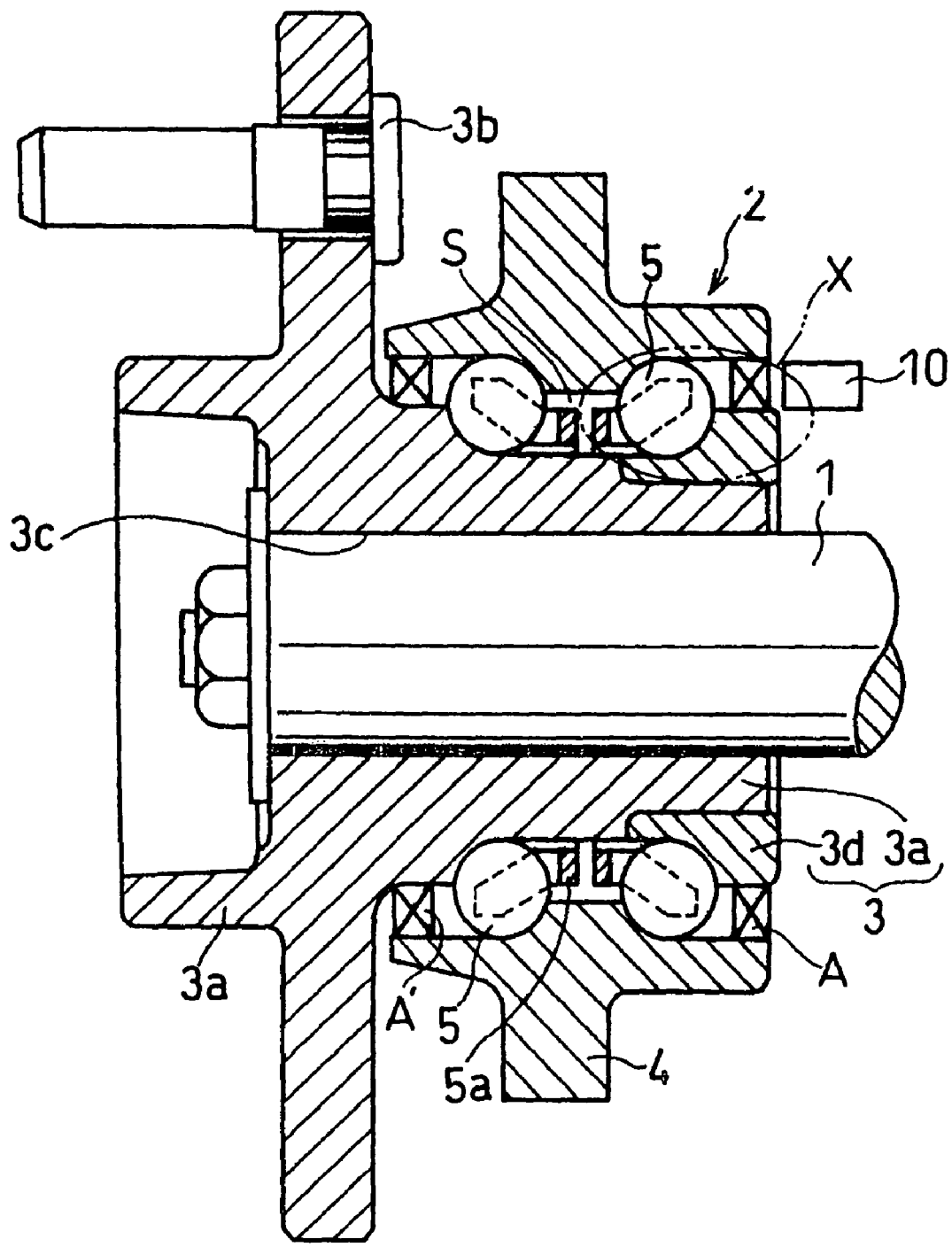
FIG. 1 is a sectional view showing an example of a bearing unit incorporated with a sealing device of one preferable embodiment of the present invention.
Figure 2:
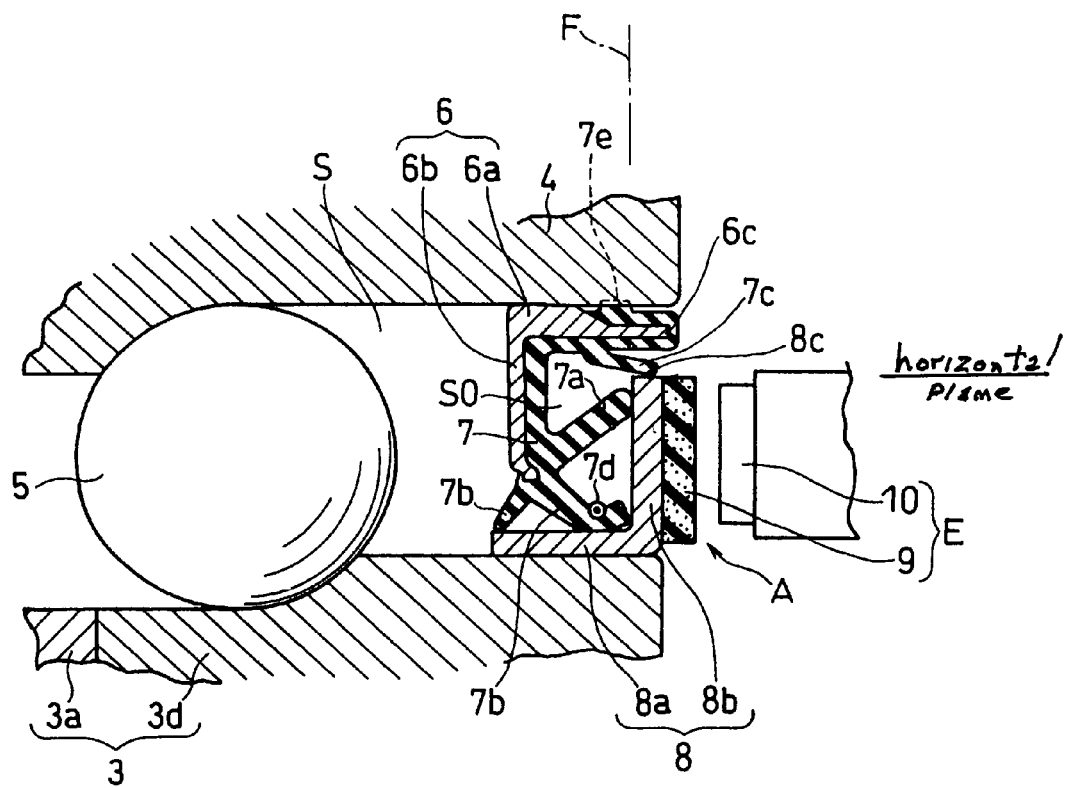
FIG. 2 is an enlarged view of the portion "X" in FIG. 1.
Figure 3:
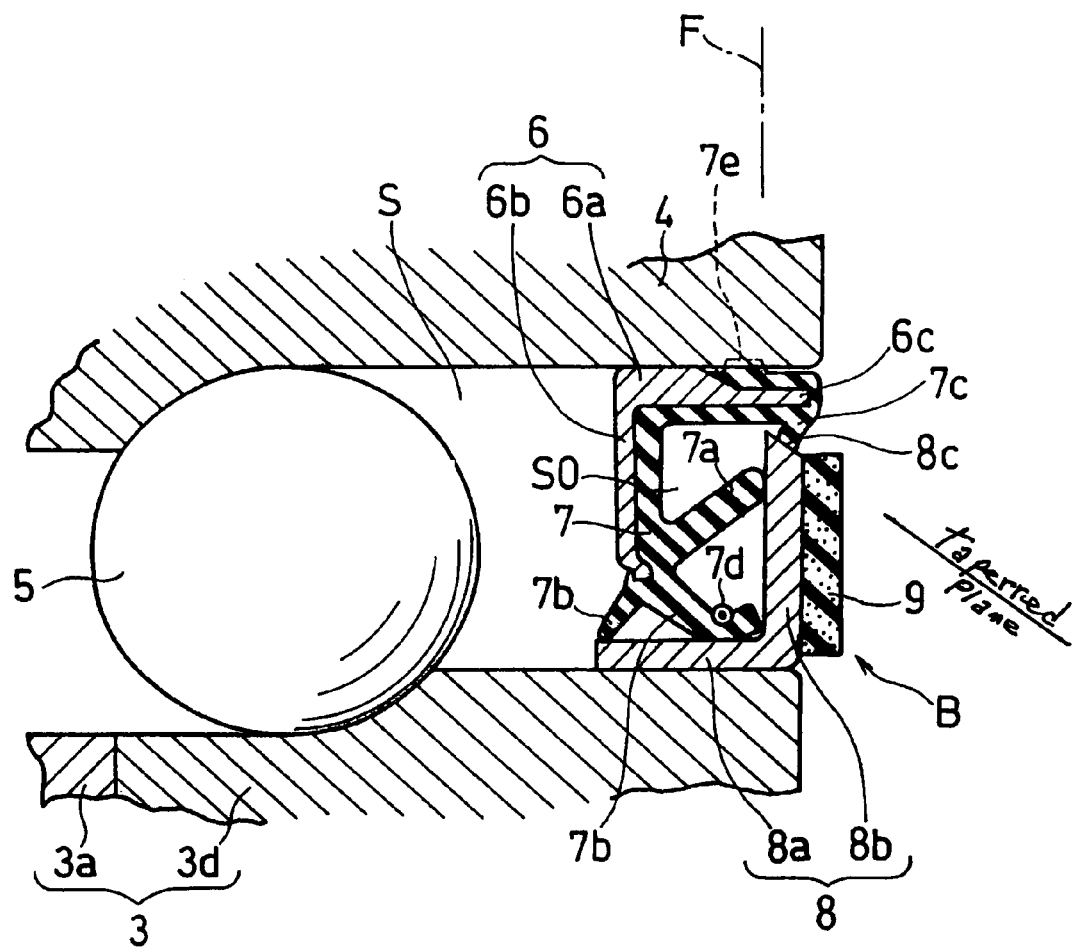
FIG. 3 shows the same portion as FIG. 2 of other preferable embodiment.
Figure 4:
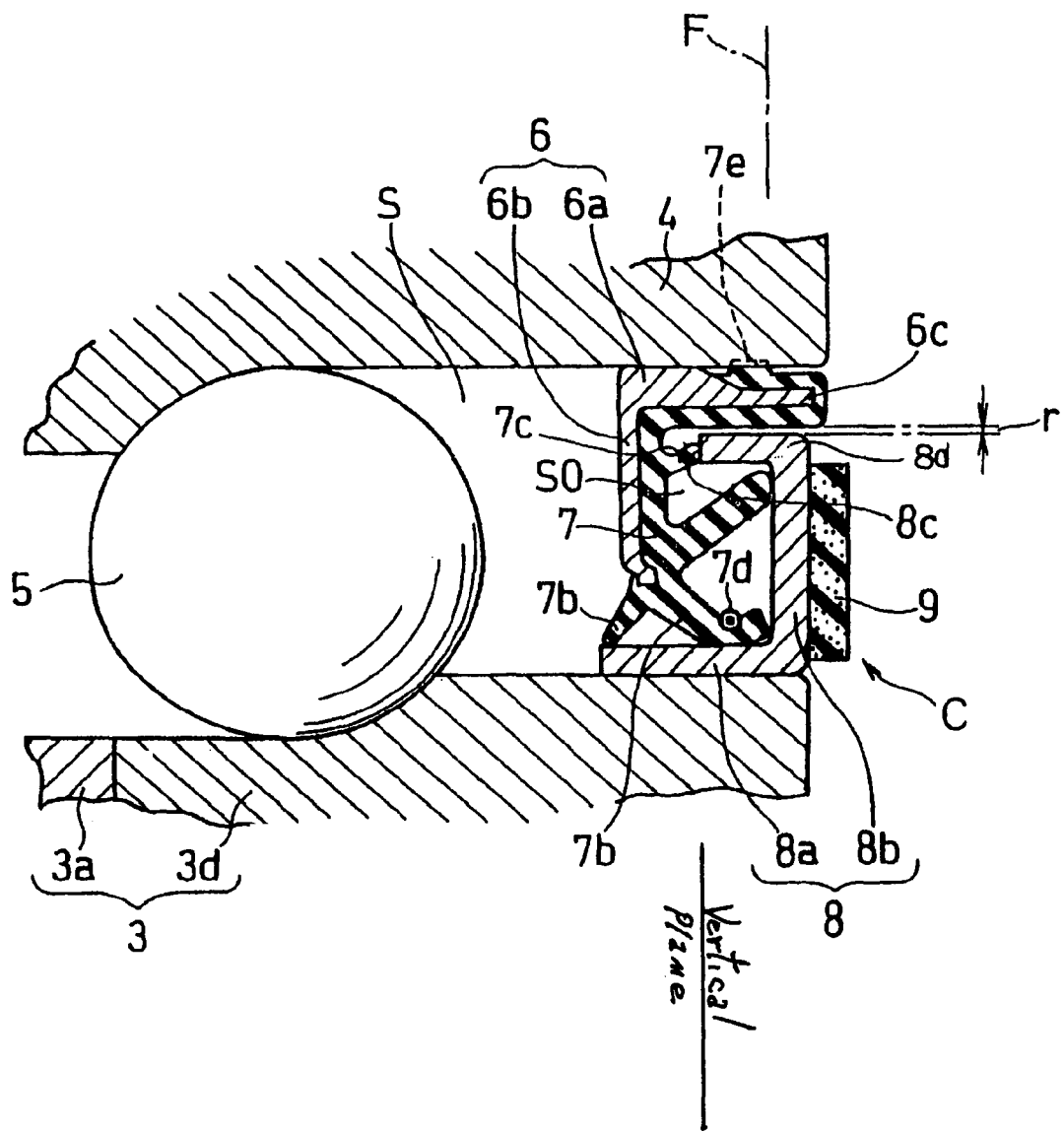
FIG. 4 shows the same portion as FIG. 2 of still other preferable embodiment.

The preferred embodiments of the present invention are explained hereinafter referring to the attached drawings. FIG. 1 is a sectional view showing an example of a bearing unit incorporated with a sealing device of one preferable embodiment of the present invention, FIG. 2 is an enlarged view of the portion "X" in FIG. 1, FIG. 3 is a view similar to FIG. 2 showing other preferable embodiment, and FIG. 4 is a view similar to FIG. 2 showing still other preferable embodiment.

Embodiment 1

FIG. 1 shows one embodiment of the structure in which vehicle wheels are supported for a driving shaft 1 with a ball bearing unit 2. A tire wheel (not shown) is fixed to a hub wheel 3a constituting an inner ring (rotary member) 3 by means of a bolt 3b. The reference numeral 3c indicates a spline hole formed in the hub wheel 3a and the driving shaft 1 is spline fitted in the hole 3c and is integrally fixed to the hub wheel 3a, thereby transmitting the rotational drive force of the driving shaft 1 into the tire wheel via the hub wheel 3a. The reference numeral 3d indicates an inner ring member, which constitutes the inner ring 3 together with the hub wheel 3a.

The reference numeral 4 indicates an outer ring (stationary member) which is attached and fixed to the vehicle suspension (not shown). Two rows of rolling elements (ball) 5 . . . are interposed while being held with a retainer 5a between the outer ring 4 and the inner ring 3 (hub 3a and inner ring member 3d). The reference numerals A and A' indicate seal rings for preventing leakage of lubricant agent (grease and the like) charged in the rolling portion of the rolling elements 5 . . . and for preventing ingress of waste water and dust from outside and they correspond to the sealing device of the present invention and are inserted under pressure between the outer ring 4 and the inner ring 3. The space surrounded with the seal rings A, A' at both sides, the inner ring 3 and the outer ring 4 constitute a sealed portion S.

FIG. 2 shows an enlarged view of the part "X" in FIG. 1. The seal ring A at vehicle body side is constructed such that a ring-like core member 6 to be fitted under pressure in the inner circumference of the outer ring 4, an elastic seal member 7 made of an elastic material such as rubber and fixed to the core member 6, and a slinger 8 externally fitted in the outer circumference of the inner ring member 3d are assembled to form a pack-seal type seal ring as shown in the figure. The slinger 8 comprises a fitting cylindrical portion 8a externally fixed in the outer circumference of the inner ring member 3d and an outward flange portion (flange like portion) 8b extending from an outer edge of the fitting cylindrical portion 8a which is outside relative to the sealed portion S into the radial direction (centrifugal direction). The elastic seal member 7 has seal lip portions 7a, 7b, 7c which elastically and slidably contact with the inner face at the sealed portion side of the outer flange like portion 8b, the outer circumference face of the fitting cylindrical portion 8a and an extended end face 8c of the outward flange portion 8b respectively. The reference numeral 7d indicates a garter spring to be mounted elastically and annularly into the peripheral body of the seal lip portion 7b in order to strengthen the elastic contacting force of the seal lip portion 7b into the outer circumferential face of the fitting cylindrical portion 8a.

The core member 6 comprises a fitting cylindrical portion 6a to be internally fitted and fixed in the inner circumference of the outer wheel 4 and an inward flange portion 6b formed at the base portion at the sealed portion S side of the fitting cylindrical portion 6a extending in the radial direction (centripetal direction). The vehicle side face (outer face) of the outward flange portion 8b of the slinger 8 is integrally attached with the tone wheel 9 which is a magnetic rubber sheet formed by mixing magnetic powder such as ferrite in a rubber material and is magnetized so as to alternately arrange plural north poles and south poles in the circumferential direction. A magnetic sensor 10 is fixed to the vehicle side (stationary member side) in such a manner that the detecting face oppose to the tone wheel 9, thereby constituting a magnetic encoder E for detecting the rotation number (rotation speed) of vehicles together with the tone wheel 9.

The core member 6 and the slinger 8 are obtained by sheet metal processing of the cold rolled steel sheet such as SPCC into the form shown in the figure. The magnetic rubber sheet constituting the seal member 7 or the tone wheel 9 is formed such that a rubber material selected from NBR, H-NBR, ACM, AEM, FKM and the like is integrally attached on the core member 6 or the slinger 8 by means of adhesive agent or at the same time of vulcanization molding to be integrated. As the rubber material for the latter, a ferrite magnetic powder or rare earth magnetic powder is mixed in advance as mentioned above.

An end face 6c opposite to the sealed portion S of the fitting cylindrical portion 6a of the core member 6 is formed so as to project outside (opposite to the sealed portion S) of an inside line F at the sealed portion S side of the outward flange portion 8b of the slinger 8. The elastic seal member 7 is formed so as to enclose the end face 6c from the inner face (the face opposite to the slinger 8) of the fitting cylindrical portion 6a of the core member 6 and extends to the outer circumference portion of the fitting cylindrical portion 6a. A nose portion 7e comprising an annular strip-like projection is provided for the elastic seal member 7 at the outer circumference portion, so that if the chamfer processing error is caused at the inner circumferential entrance end, such error is absorbed to be tightly fitted into the inner circumferential portion of the outer ring 4.

Among the plural seal lip portions 7a, 7b, 7c, the seal lip portion 7c which elastically and slidably contacts with the extended end face 8c of the outward flange portion 8b of the slinger 8 is formed like a tongue so as to project out of the elastic seal member 7 locating in the fitting cylindrical portion 6a of the core member 6 directing into the slinger 8 outside of the sealed portion S. When the seal ring A is assembled, the seal lip portion 7c is designed to elastically contact with the extended end face 8c of the outward flange portion 8b accompanied with elastic deformation. According to the seal ring A mounted between the inner ring 3 and the outer ring 4, the slinger 8 axially rotates around the center of the driving shaft 1 following the axial rotation of the driving shaft 1 and the inner ring 3 and the seal lip portions 7a, 7b, 7c slidably contact with the inner face and the extended end face 8c of the slinger 8 in an elastic condition. At the same time the tone wheel 9 axially rotates around the center of the driving shaft 1, the magnetic sensor 10 detects the alternate magnetic change in the N poles and the S poles following the rotation of the tone wheel 9 and counts the pulse signals caused by the magnetic change, thereby calculating the rotation speed and so on of the driving shaft 1, namely the tire wheel (not shown).

The space portion SO formed by the slinger 8 and the core member 6 with the elastic seal member 7 is closed by the seal lip portion 7c which is positioned at the border of the slinger 8 and the core member 6 exposed to the exterior environment, so that the space portion SO becomes a completely closed space and the grist and dust cannot be entered into the space portion SO from outside. Further the seal lip portion 7c is formed like a tongue so as to project toward the slinger 8 directing into the outside of the sealed portion S as mentioned above, and in addition to the fact that the end face 6c of the fitting cylindrical portion 6a of the core member 6 is formed so as to project out of the line F, the prevention ability for the ingress of grist and dust from outside becomes strong and the prevention function is kept for a long time. Therefore, the grist and dust do not enter the space portion SO, so that they do not enter the elastically and slidably contacting portion of the seal lip portions 7a, 7b to the inside of the slinger 8, thereby keeping the sealing performance of the elastic seal member 7 and improving the durability.

The seal ring (sealing device) B shown in FIG. 3 is characterized in that an extended end face 8c of the outward flange portion 8b of the slinger 8 is tapered. The tapered face is designed to have gradually larger diameter from the outside into the sealed portion S. The seal lip portion 7c provided for the elastic seal member 7 is similarly contacted with the tapered extended end face 8c elastically. In this case, because the extended end face 8c is tapered, the elastic contacting area is practically enlarged, so that the dimension error can be absorbed to keep a preferable elastic contacting condition. Further, even when the external force caused by the grist and dust acts on the seal lip portion 7c, the component force by the tapered face acts on the seal lip portion 7c as the reaction force and the elastic contacted condition of the seal lip portion 7c and the extended end face 8c is kept. Other structures and effects are the same as the above-mentioned embodiment, so the common members have the same reference numerals and their explanations are omitted here.

The seal ring (sealing device) C shown in FIG. 4 is characterized in that the tip end portion at the extended side of the outward flange portion 8b of the slinger 8 is further bent into the sealed portion S to form a second cylindrical portion (outer cylindrical portion) 8d which is concentric with the fitting cylindrical portion 8a of the slinger 8. The seal lip portion 7c of the elastic seal member 7 is formed so as to elastically contact with the extended end face 8c directing to the sealed portion S. In this case, the space portion SO is surrounded with the double cylindrical portions of the fitting cylindrical portion 8a and the second cylindrical portion 8d of the slinger 8 and the core member 6 having the elastic seal member 7, so that it becomes a completely closed space and prevents the ingress of grist and dust. Further, the clearance between the second cylindrical portion 8d and the elastic seal member 7 at the fitting cylindrical portion 6a side of the core member 6 forms a labyrinth "r" which has the width in its thrust direction and the ingress of grist and dust is also prevented by the labyrinth "r". In addition to the function that the lip portion elastically and slidably contacts with the extended end face of the slinger, the preventing function of ingress of the grist and dust into the space SO can be more improved. Other structures and effects are the same as the above-mentioned embodiment, so the common members have the same reference numerals and their explanations are omitted here.

In the above-mentioned embodiments, the sealing device of the present invention is applied to the seal ring A at the vehicle side shown in FIG. 1, however, it goes without saying that the sealing device can be applied to the seal ring A' at the wheel side, in which the tone wheel is not provided. Further, in the above-mentioned embodiments, the inner ring 3 is set as a rotary member and the outer ring 4 is set as a stationary member, however, they may be set vice versa, in such a case the directions of the outward flange portion 8b of the slinger 8 and the inward flange portion 6b of the core member 6 are reversed respectively, accordingly it goes without saying that the shapes of the other portions are changed in such a manner that the diameter of the tapered face is made gradually smaller into the sealed portion S. Still further according to the above-mentioned embodiments, the sealing device of the present invention is applied to a bearing unit supporting the wheel shaft of the vehicle, however, it can be applied to the other mechanism which requires sealing.

The invention claimed is:

1. A sealing device comprising a slinger fixedly fitted onto a rotary member, a core member fixedly fitted into a stationary member, and an elastic seal member attached to the core member, the elastic seal member having a plurality of seal lip portions elastically and slidably contacting with the slinger, thereby sealing a space to be sealed between the stationary member and the rotary member, wherein:

said slinger has a first fitting cylindrical portion to be fitted onto said rotary member and a flange portion extending in its radial direction from an outer edge of said first fitting cylindrical portion opposite to said space, said flange portion defining a terminal end face and two radial faces, said terminal end face being between said two radial faces; and said core member has at least a second fitting cylindrical portion to be fitted into said stationary member, whose outer end opposite to said space projects beyond the inside of said flange like portion of said slinger; and one of said plurality of seal lip portions is formed so as to elastically and slidably contact with said terminal end edge face of said flange portion of said slinger.

2. The sealing device as set forth in claim 1, wherein:
said terminal end face of said flange like portion is tapered.

3. The sealing device as set forth in claim 2, wherein:
said flange portion is bent toward said space so as to form a second cylindrical portion in concentric with said first fitting cylindrical portion of said slinger.

4. The sealing device as set forth in claim 3, wherein:
a tone wheel is integrally attached to the outer surface of said flange like portion of said slinger; and
said tone wheel is magnetized in such a manner that a plurality of N poles and S poles are provided alternately in a circumferential direction, thereby constituting a magnetic encoder with a magnetic sensor fixed to the stationary member.

5. The sealing device as set forth in claim 2, wherein:
a tone wheel is integrally attached to the outer surface of said flange portion of said slinger; and
said tone wheel is magnetized in such a manner that a plurality of N poles and S poles are provided alternately in a circumferential direction, thereby constituting a magnetic encoder with a magnetic sensor fixed to the stationary member.

6. The sealing device as set forth in claim 1, wherein:
said flange portion is bent toward said space so as to form a second cylindrical portion concentric with said first fitting cylindrical portion of said slinger.

7. The sealing device as set forth in claim 6, wherein:
a tone wheel is integrally attached to the outer surface of said flange portion of said slinger; and
said tone wheel is magnetized in such a manner that a plurality of N poles and S poles are provided alternately in a circumferential direction, thereby constituting a magnetic encoder with a magnetic sensor fixed to the stationary member.

8. The sealing device as set forth in claim 1, wherein:
a tone wheel is integrally attached to the outer surface of said flange portion of said slinger; and
said tone wheel is magnetized in such a manner that a plurality of N poles and S poles are provided alternately in a circumferential direction, thereby constituting a magnetic encoder with a magnetic sensor fixed to the stationary member.

\* \* \* \* \*